(12) United States Patent
Ray (10) Patent No.: US 9,910,132 B2
(45) Date of Patent: Mar. 6, 2018

(54) SYSTEMS AND METHODS FOR COHERENT SIGNAL FUSION FOR TIME AND FREQUENCY ESTIMATION

(71) Applicant: THE BOEING COMPANY, Huntington Beach, CA (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 597 days.

(21) Appl. No.: 14/537,351

(22) Filed: Nov. 10, 2014

(65) Prior Publication Data

US 2016/0131734 A1 May 12, 2016

(51) Int. Cl.
G01S 5/06 (2006.01)
G01S 5/10 (2006.01)
G01S 5/02 (2010.01)

(52) U.S. Cl.
CPC .......... *G01S 5/06* (2013.01); *G01S 5/02* (2013.01); *G01S 5/0221* (2013.01); *G01S 5/0257* (2013.01); *G01S 5/10* (2013.01)

(58) Field of Classification Search
CPC . G01S 5/0257; G01S 5/06; G01S 5/10; G01S 5/12
See application file for complete search history.

(56) References Cited

U.S. PATENT DOCUMENTS

| 7,012,552 | B2 | | 3/2006 | Baugh et al. | |
|---|---|---|---|---|---|
| 8,009,100 | B2 | * | 8/2011 | Falk | G01S 5/0221 342/465 |
| 8,340,683 | B2 | * | 12/2012 | Islam | H04W 64/00 370/329 |
| 8,958,754 | B2 | * | 2/2015 | Osinusi | G01S 5/0205 455/343.2 |
| 2011/0068973 | A1 | | 3/2011 | Humphreys et al. | |
| 2012/0029867 | A1 | | 2/2012 | Maher et al. | |

OTHER PUBLICATIONS

Chestnut, "Emitter Location Accuracy Using Tdoa and Differential Doppler" IEEE Transactions on AES, Mar. 1982.*
Ulman, "Wideband TDOA/FDOA Processing Using Summation of Short-Time CAFs," IEEE Transactions on Signal Processing Dec. 1999.*

* cited by examiner

Primary Examiner — Gregory C Issing
(74) Attorney, Agent, or Firm — Armstrong Teasdale LLP (57) ABSTRACT

A signal processing system is provided. The signal processing system includes a transmission architecture configured to transmit first and second signals, and a receiver architecture including an antenna configured to receive the signals, and a coherent signal fusion processing device communicatively coupled to the antenna. The processing device is configured to generate a broadband analog signal that contains the first and second signals, digitize the broadband analog signal, isolate first and second signals of interest, estimate, relative to a reference template, at least one of a time difference of arrival and a frequency difference of arrival for at least one of the first and second signals of interest, and determine a location of at least one of the transmission architecture and the receiver architecture based on the estimated at least one of a time difference of arrival and a frequency difference of arrival.

17 Claims, 5 Drawing Sheets

SYSTEMS AND METHODS FOR COHERENT SIGNAL FUSION FOR TIME AND FREQUENCY ESTIMATION

BACKGROUND

The field of the disclosure relates generally to signal processing, and, more particularly, to performing coherent signal fusion for time and frequency estimation.

Measurement of time of arrival and frequency of arrival of signals by sensors systems, as well as time difference and frequency difference of arrival is important for many receiver measurements that are basic to such problems as timing acquisition, position and velocity estimation, and orientation estimation.

However, existing legacy signals may not have sufficient bandwidth to be used for such estimates, as the resulting accuracy may be too poor to be useful. However, retrofitting new transmitter systems onto exiting systems and platforms is often relatively difficult. For example, space and power demands for new transmitters may be too high. Other issues include obtaining spectral allocations for new transmission systems, which may be both expensive and time-consuming.

BRIEF DESCRIPTION

In one aspect, a signal processing system is provided. The signal processing system includes a transmission architecture configured to transmit a first signal and a second signal, and a receiver architecture including at least one antenna configured to receive the first and second signals, and a coherent signal fusion processing device communicatively coupled to the at least one antenna. The coherent signal fusion processing device is configured to generate a broadband analog signal that contains the first and second signals, digitize the broadband analog signal, isolate a first signal of interest and a second signal of interest from the digitized signal, estimate, relative to a reference template, at least one of a time difference of arrival and a frequency difference of arrival for at least one of the first and second signals of interest, and determine a location of at least one of the transmission architecture and the receiver architecture based on the estimated at least one of a time difference of arrival and a frequency difference of arrival for at least one of the first and second signals of interest.

In another aspect, a location system configured to determine a location of at least one of a transmission architecture and a receiver architecture is provided, the location system including a coherent signal fusion processing device that includes a coherent signal fusion processing device for use in processing signals is provided. The coherent signal fusion processing device includes a memory device, and a processor communicatively coupled to the memory device, the processor configured to receive first and second signals, generate a broadband analog signal that contains the first and second signals, digitize the broadband analog signal, isolate a first signal of interest and a second signal of interest from the digitized signal, estimate, relative to a reference template, at least one of a time difference of arrival and a frequency difference of arrival for at least one of the first and second signals of interest, and output the estimated at least one of a time difference of arrival and a frequency difference of arrival for at least one of the first and second signals of interest.

In yet another aspect a signal processing method is provided. The method includes receiving first and second signals at a coherent signal fusion processing device, generating, using the coherent signal fusion processing device, a broadband analog signal that contains the first and second signals, digitizing, using the coherent signal fusion processing device, the broadband analog signal, isolating, using the coherent signal fusion processing device, a first signal of interest and a second signal of interest from the digitized signal, estimating, using the coherent signal fusion processing device, relative to a reference template, at least one of a time difference of arrival and a frequency difference of arrival for at least one of the first and second signals of interest, and outputting the estimated at least one of a time difference of arrival and a frequency difference of arrival for at least one of the first and second signals of interest.

DETAILED DESCRIPTION

The systems and methods described herein provide improved signal analysis while using existing transmitter and receiver systems, without requiring new transmitter hardware or new waveforms. Using the embodiments described herein, existing legacy signals may be utilized for much more precise time and frequency estimation by fusing receiver processing of multiple legacy systems in a coherent manner. The systems and methods described herein allow for precise timing and frequency estimation using a wideband analog to digital receiver with filtering and a complex offset ambiguity function calculation. The results of the processing can be used for timing acquisition, position estimation, velocity estimation, orientation estimation, as well as many other precision tasks that are ordinarily impossible with legacy signals.

The systems and methods described herein use coherent signal fusion, which is the methodology of combining two or more signal receptions at different frequencies using a wide-band analog to digital converter (ADC) and then processing the combined signal using a complex offset ambiguity function to estimate time and frequency arrival against a reference signal template. This reference template may be defined through knowledge of existing signals, or could be another signal reception at a different location. In the latter situation, the reference template is communicated to a coherent signal fusion processor.

For coherent signal fusion, it is assumed that an emitter (either stationary or moving) transmits two or more relatively narrow band legacy signals at different frequencies during standard operation. As used herein, "legacy signals" refers to signals transmitted under existing, known formats. This transmission may be performed with one or two antennas in the same or different physical locations on a rigid body. A receiver with a wide-band signal fusion processor receives and digitizes both signals coherently. The receiver then filters the signals individually with constant group delay filters, combines the signals, and performs the complex offset ambiguity computation to estimate time and/or frequency offsets against the reference template. This reference template may be defined through knowledge of existing signals, or may be from another signal collection at the same time but a different location. The resulting time and/or frequency estimates are significantly more accurate than if each narrow band legacy signal was used separately for the same estimates. This implies that all the signals can be simultaneously captured by one or more receivers in a single digital buffer each where the multiple frequencies have not yet been down-converted to base-band, but reside at the intermediate frequency of the wide-band receiver's settings.

Processing signals using the systems and methods described herein provides many practical applications. For example, the systems and methods described herein may be utilized to improve satellite communications systems, satellite positioning systems, tracking of objects or vehicles (e.g., aircraft), etc. That is, as will be appreciated by those of skill in the art, generating more accurate timing estimations, position estimations, velocity estimations, and/or orientation estimations using the embodiments described herein facilitates improvements in multiple communications applications, object tracking/location applications, and other applications. For example, the estimates may be used to determine a location of a transmission architecture transmitting the signals or a receiver architecture receiving the signals.

Figure 1:
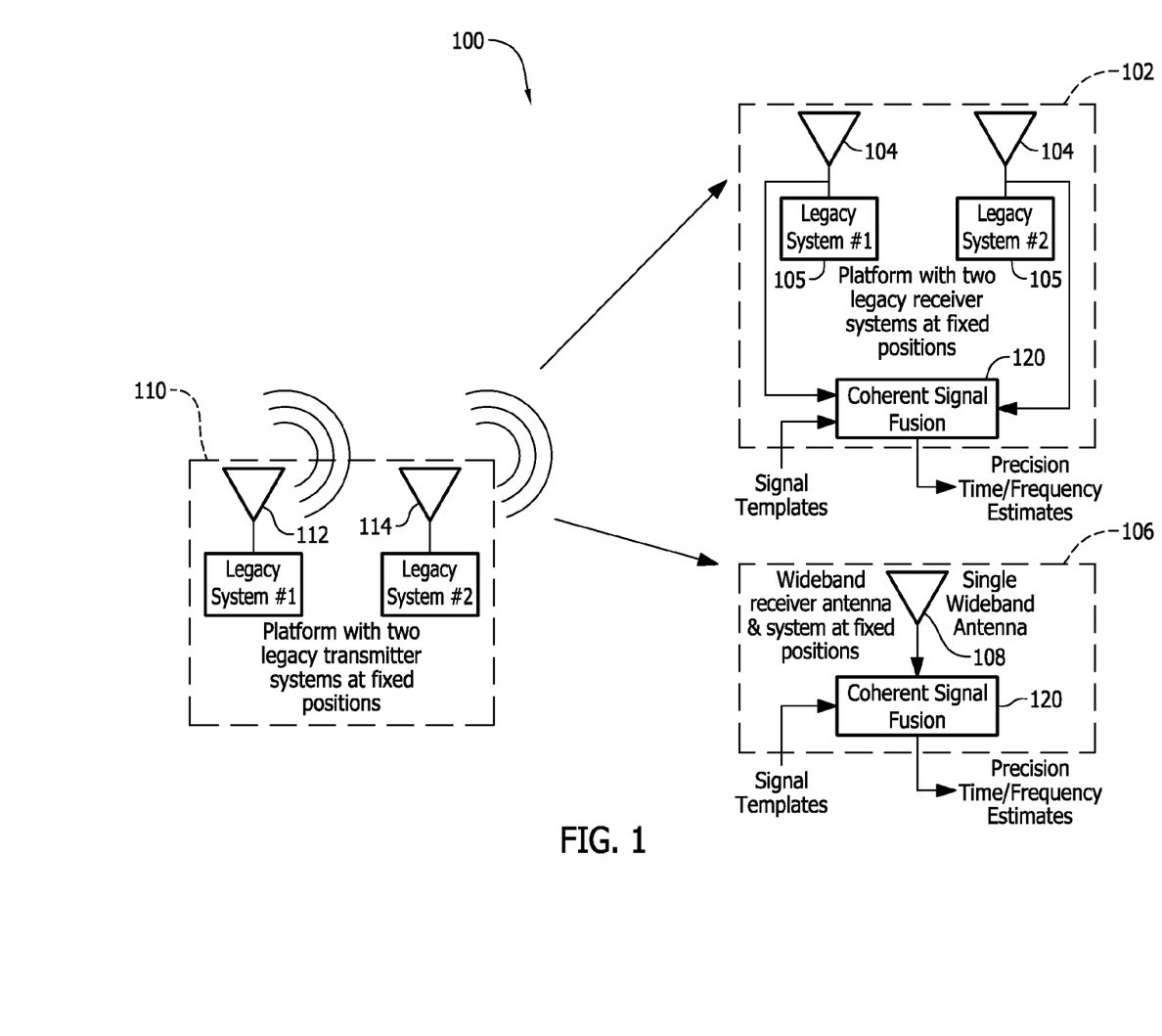
FIG. 1 is a schematic view of an exemplary signal processing system.

FIG. 1 is a schematic view of an exemplary signal processing system 100. System 100 includes two possible receiver architectures. A first receiver architecture 102 uses existing legacy antennas 104 coupled to associated legacy systems 105, and a second receiver architecture 106 uses a single wideband antenna 108.

In system 100, a transmission architecture 110 includes a first legacy transmitter 112 and a second legacy transmitter 114. Each transmitter 112 and 114 transmits an associated legacy signal. To process the legacy signals, as described herein, the legacy signals should have at least some temporal overlap. That is, the signals need not begin and end at the same time, but should coexist for a period of time.

For first receiver architecture 102, each legacy antenna 104 receives a respective legacy signal, which is provided to a coherent signal fusion processing device 120. In second receiver architecture 106, wideband antenna 108 receives both legacy signals from first and second legacy transmitters 112 and 114, and provides them to coherent signal fusion processing device 120. Coherent signal fusion processing device 120 also receives signal templates (i.e., reference templates), and outputs precision time and/or frequency estimates, as described in detail herein.

Figure 2:
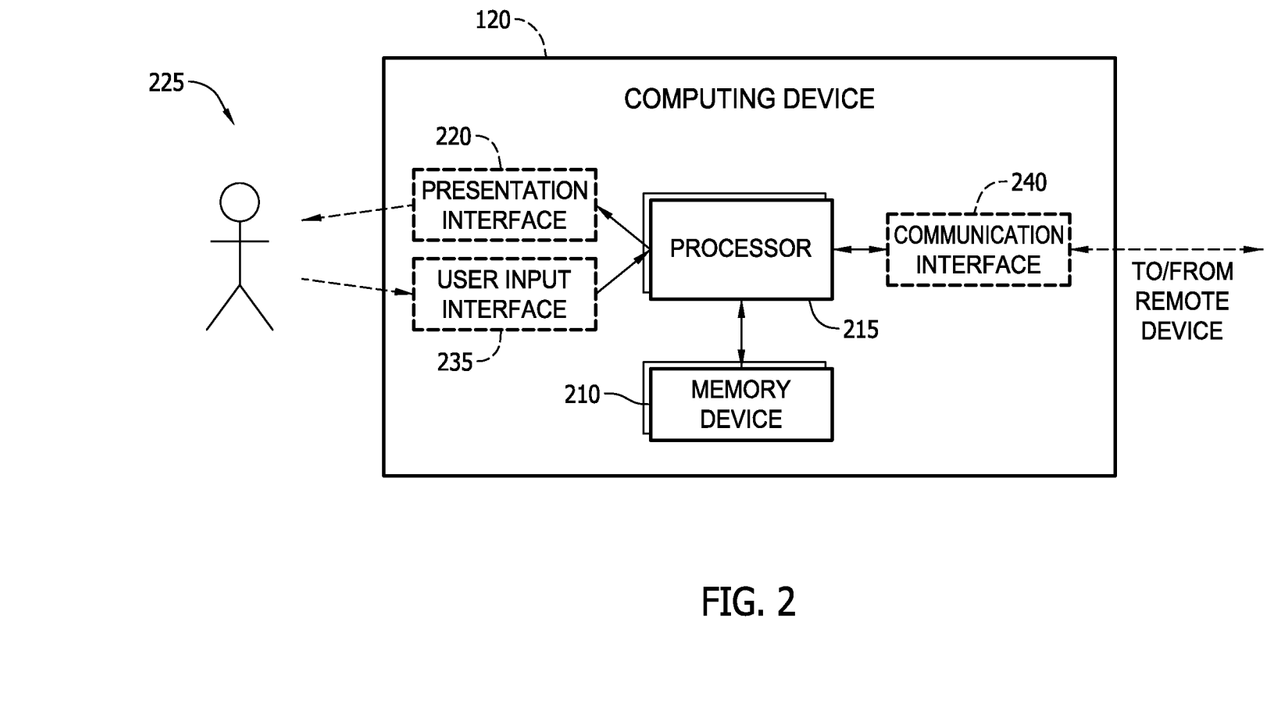
FIG. 2 is a block diagram of an exemplary coherent signal fusion processing device that may be used with the system shown in FIG. 1.

FIG. 2 is a block diagram of coherent signal fusion processing device 120 that may be used with system 100 (shown in FIG. 1). Coherent signal fusion processing device 120 includes at least one memory device 210 and a processor 215 that is coupled to memory device 210 for executing instructions. In some implementations, executable instructions are stored in memory device 210. In the exemplary implementation, coherent signal fusion processing device 120 performs one or more operations described herein by programming processor 215. For example, processor 215 may be programmed by encoding an operation as one or more executable instructions and by providing the executable instructions in memory device 210.

Processor 215 may include one or more processing units (e.g., in a multi-core configuration). Further, processor 215 may be implemented using one or more heterogeneous processor systems in which a main processor is present with secondary processors on a single chip. In another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary implementation, processor 215 processes legacy signals to output precision time and/or frequency estimates, as described herein.

In the exemplary implementation, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data. Further, reference templates may be stored on memory device 210.

In the exemplary implementation, coherent signal fusion processing device 120 includes a presentation interface 220 that is coupled to processor 215. Presentation interface 220 presents information to a user 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some implementations, presentation interface 220 includes one or more display devices.

In the exemplary implementation, coherent signal fusion processing device 120 includes a user input interface 235. User input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

Coherent signal fusion processing device 120, in the exemplary implementation, includes a communication interface 240 coupled to processor 215. Communication interface 240 communicates with one or more remote devices. To communicate with remote devices, communication interface 240 may include, for example, a wired network adapter, a wireless network adapter, and/or a mobile telecommunications adapter.

Figure 3:
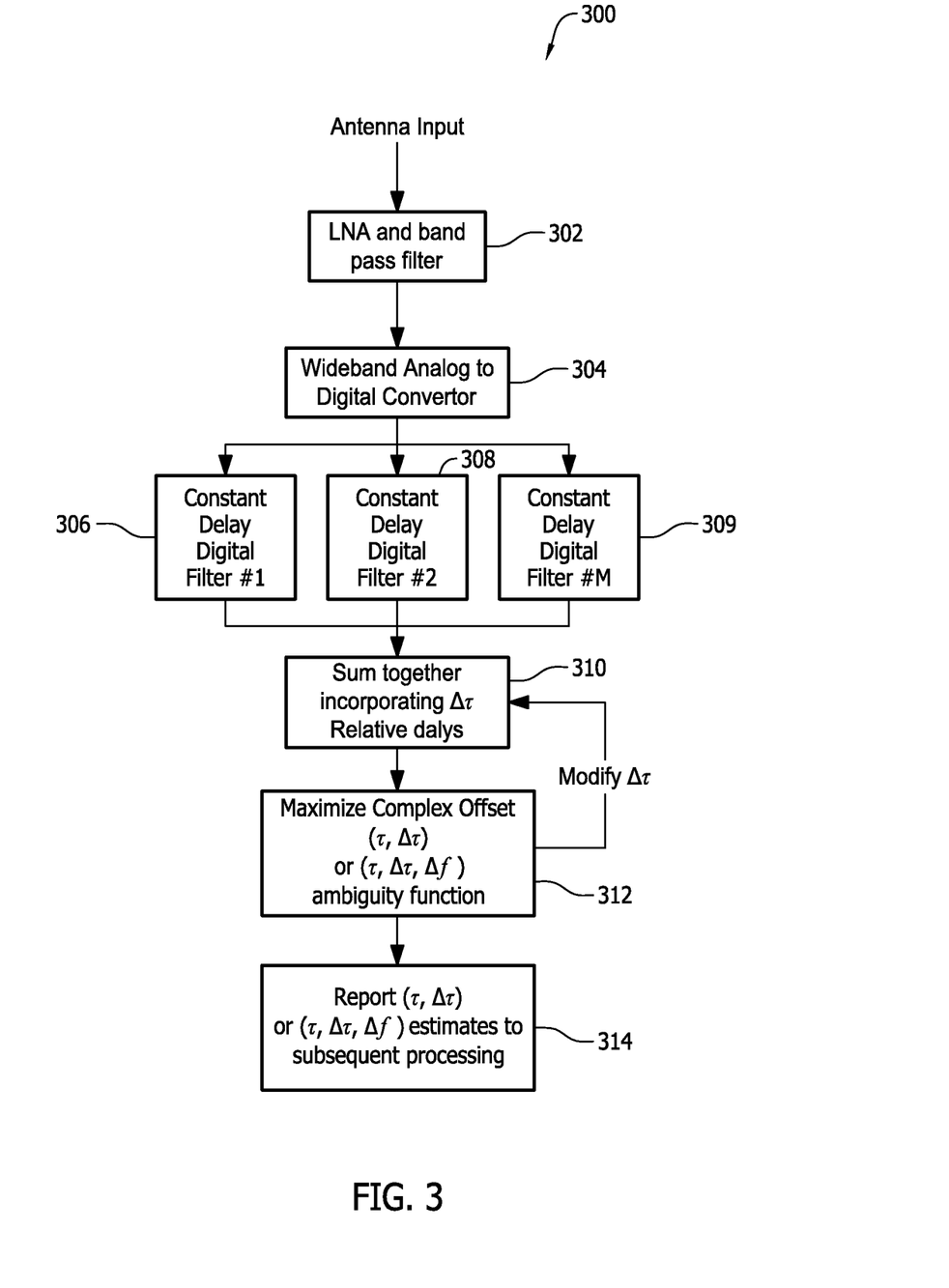
FIG. 3 is a flowchart illustrating an exemplary signal processing method that may be implemented using the system shown in FIG. 1.

FIG. 3 is a flowchart illustrating a signal processing method 300 that may be used with signal processing system 100. In the exemplary embodiment, method 300 is implemented using coherent signal fusion processing device 120 (shown in FIG. 1). At block 302, the antenna input (i.e., from legacy antennas 104 or wideband antenna 108) is amplified and filtered to generate a broadband analog signal containing all of the relevant signals to be fused. This may be performed, for example, using a low noise amplifier (LNA) and a band pass filter covering the frequencies of all the signals of interest).

At block 304, a wideband ADC digitizes the broadband analog signal. In the exemplary embodiment, the ADC can support 4 GHz or more of RF bandwidth. At blocks 306, 308, and 309, M constant delay digital filters (either finite impulse response or infinite impulse response) are used to isolate the signals of interest from background signals and noise. Down conversion does not occur in the exemplary embodiment. The isolated signals are summed at block 310. At block 312, a complex offset ambiguity function (COAF) is calculated to estimate both a time difference, τ, from a reference template (or other signal reception by another such system), as well as an offset, Δτ, and (optionally) a frequency offset, Δf. At block 314, the estimates are reported (e.g., to a user) for subsequent processing. For example, the estimates may be displayed on presentation interface 220 (shown in FIG. 2). These estimates may be used by the user to facilitate improving communications, determining a position of an object, tracking an aircraft, etc.

The COAF will now be described in detail. In radar and signal processing, a complex ambiguity function (CAF) is a two-dimensional function of time delay and Doppler frequency $\chi(\tau,f)$ that computes the distortion of a returned pulse at the receiver due to the time and Doppler shift of the returned signal. Similarly, the CAF computes a relative distortion between two receivers that receive a common pulse from a moving target, the two receivers having different positions and/or velocities with respect to one another. There is some variation in the field concerning the definition of the CAF; sometimes the definition of the CAF is given as a magnitude squared of the following definition. In this embodiment, however, the definition of the CAF for a pair of complex base-band or IF signals U(t) and V(t) is as follows:

$$\chi U,V(\tau,f) = \int_{-\infty}^{\infty} U(t)\overline{V(t-\tau)} e^{2\pi i f t} dt$$

where the overline denotes complex conjugate and i is the imaginary unit. The CAF can also be defined for a single signal S(t) as:

$$\chi S(\tau,f) = \int_{-\infty}^{\infty} S(t)\overline{S(t-\tau)} e^{2\pi i f t} dt$$

Note that for zero Doppler shift (f=0), $\chi(\tau,0)=\chi(\tau)$ reduces to a complex autocorrelative of S(t). The CAF can also be defined for discretely sampled signals U[n] and V[n] at discrete frequency bins {v} with a summation instead of an integral as in the following equation:

$$\chi U,V(\delta,v) = \sum_{n=0}^{N-1} U[n]\overline{V[n-\delta]} e^{\frac{2\pi i v n}{F_s}} dt$$

where δ is an integer delay, v represents the integer Doppler variable, $F_s$ is the sample rate, and sample values are handled appropriately when the index is outside the range of 0, 1, . . . , N−1.

Notably, an important aspect of various embodiments described herein is a wideband IF sampled signal that includes a collection of narrow band complex signals $\{s_i(t)\}$ where if S is the wideband signal containing all the narrow band signals, then:

$$S(t) = \sum_i s_i(t)$$

In sampled form:

$$S[n] = \sum_i s_i[n]$$

where each narrow band signal is shown here as being sampled at the same sample times as the wideband signal. Since the frequency (and the timing) of each narrow band signal is known, narrow band constant group delay subsampling filters $F_i$ can be predesigned so that:

$$\hat{s}_i^*(t) = F_i(S(t)) \approx s_i(t)$$

Thus, these narrow band filters can be used not only to recover all the relevant constituent signals, but by using upsampling interpolating constant group delay filters $G_i$, a new signal $\hat{S}$ can be constructed as $$\hat{S}(t) = \sum_i \mathcal{G}_i(\mathcal{F}_i(S(t)))$$

The new signal contains all the relevant narrowband signals being used for delay and Doppler estimation, together with noise (and possible interfering signals) only within the bandwidths of the respective narrow band signals, but not the other noise and interfering signals within the much wider bandwidth of S(t). Thus, a new received signal has been constructed without reducing the SNR or SNR of the original narrow band signals. This is one factor in the performance gain realized using the systems and methods described herein. Note that as shown in FIG. 3, these filters can be incorporated into a single filter for each narrow band signal.

Also note that if the captured signal S(t) containing the narrow band signals for delay and Doppler estimation is compared against a signal template T(t) also containing these signals, the relative delays among the $\{s_i(t)\}$ will likely be different within S(t) than those within T(t). Thus, if a correlation is attempted between the two in order to infer an overall time difference, the results will likely be poor. One reason is that the locations of the antenna phase centers for all the narrow band transmitters will likely be different in range and angle relative to the receiver from one time to the next, due to platform motion of the transmitters and/or receivers. Further, if the signal template is from another receiver at a different location, it will certainly have a different range and angle to the respective antenna phase centers from the first receiver.

Thus, in order to gain back the full correlation gain, the correct relative signal delays must be incorporated into the sum that creates $\hat{S}(t)$. Let: $\vec{\Delta\tau} = \{\Delta\tau_i\}$ be the correct signal delays for $\{\hat{s}_i(t)\}$. Then, delay each interpolated upsampled signal $G_i(\hat{s}_i)$ in the wideband sample rate by computing:

$$\mathcal{G}_i(\hat{s}_i)(t-\Delta\tau_i)$$

and compute the corrected signal as:

$$\hat{S}_{\vec{\Delta\tau}}(t) = \sum_i \mathcal{G}_i(\hat{s}_i)(t - \Delta\tau_i)$$

To find these generally unknown relative delays requires a new ambiguity function. The systems and methods described herein use a complex offset ambiguity function (COAF) for which a reference signal U(t) and M complex summand signals {$v_i(t)$} forming a single signal V(t) is given by:

$$X_S^o(\tau, \vec{\Delta\tau}, f) = \int_{-\infty}^{\infty} U(t) \overline{V_{\vec{\Delta\tau}}[t-\tau]} e^{i2\pi ft} dt$$

where the overline denotes the complex conjugate and i is the imaginary unit. The COAF can also be defined for discretely sampled signals U[n] and V[n] with summand discrete signals {$v_i[n]$} at discrete frequency bins using a summation instead of an integral. Note that the COAF can also be defined where the frequency parameter f=0. In this case, it is denoted by $\chi_S^o(\tau, \vec{\Delta\tau})$.

By maximizing the COAF over its parameters the overall signal propagation delay and Doppler relative to the template signal can be recovered, as well as the correct unknown relative delays as well. Note that it can be assumed that $\Delta\tau_1=0$, such that there are a total of M+1 parameters in the most general case with M constituent narrow band signals.

The embodiments described herein take a coherent wideband sampling of two or more low bandwidth signals separated in frequency, and create a single wide-band sampled signal for correlation processing as part of the COAF computation. This signal processing allows for improved timing estimations, position estimations, velocity estimations, and/or orientation estimations, which may be used to determine a location of a transmission architecture transmitting the signals and/or a receiver architecture receiving the signals.

The potential performance improvement of the methods described herein can be calculated theoretically using Cramer-Rao bounds on time difference of arrival (TDOA) variance, which states that:

$$\sigma_{TDOA}^2 \geq \frac{(0.55)^2}{SNR * BW^3 * T}$$

and the bound on frequency difference of arrival (FDOA), which states that:

$$\sigma_{FDOA}^2 \geq \frac{(0.55)^2}{SNR * T^3 * BW}.$$

Here, T is a signal duration, BW is a signal bandwidth, and SNR is a signal to noise ratio. Using narrow band constant delay filters tuned to the bandwidth of various legacy narrow-band signals, assume that both methods (i.e., using the legacy signals separately versus together coherently) have the same SNR. Suppose that $\{b_i\}_{i=1}^M$ are the two-sided bandwidths of the M narrow band legacy signals centered at the ordered frequencies $\{f_i\}_{i=1}^M$ with durations $\{T_i\}$. Then the combined signal transmission has the wider bandwidth of:

$$BW_{all} = b_1/2 + (f_M - f_1) + b_m/2.$$

The duration from the beginning of the first signal to the end of the last signal can similarly be computed as:

$$T_{all} = t_{last,end} - t_{first,start}$$

where $T_i = t_{i,end} - t_{i,start}$. This is symbolically the time of the end of the last signal minus the beginning of the first signal.

It is not necessary that the signals be on simultaneously, as long as they are sampled and processed coherently. Of course, a strong template to correlate against would be another collect; it is unlikely that the exact timing would be known already. The relative performance improvement (reduction in TDOA variance) of the methods disclosed herein for TDOA signals sampled coherently over the time of the same duration and same SNR is then:

$$\sigma_{TDOA}^2(\text{all})/\sigma_{TDOA}^2 = \frac{(0.55)^2}{SNR * BW_{all}^3 * T_{all}} \bigg/ \left[\frac{1}{M}\sum_{i=1}^M \frac{(0.55)^2}{SNR * b_i^3 * T_i}\right] = \frac{M}{\frac{1}{\sum_i b_i^3 T_i}(b_1/2 + (f_M - f_1) + b_M/2)^2}$$

Similarly, the relative performance improvement (reduction in FDOA variance) of the methods described herein for FDOA for simultaneous signals of the same duration and same SNR is then:

$$\sigma_{FDOA}^2(\text{all})/\sigma_{FDOA}^2 = \frac{(0.55)^2}{SNR * T^3 * BW_{all}} \bigg/ \left[\frac{1}{M}\sum_{i=1}^M \frac{(0.55)^2}{SNR * T_i^3 * b_i}\right] = \frac{M}{\frac{1}{\sum_i T_i^3 b_i}(b_1/2 + (f_M - f_1) + b_M/2)}$$

Because the frequency difference between the signals is typically much greater than their individual bandwidths, the systems and methods described herein have significant advantages. In the simplest case, assuming that the wideband signal has W times the bandwidth of each of the M narrow-band signals and V times in duration. Then a theoretical performance increase over previous methods is as shown in the following Table 1.

TABLE 1

|  | TDOA | FDOA |
|---|---|---|
| Relative improvement factor in $\sigma^2$ | $W^3 V/M^2$ | $V^3 W/M^2$ |
| Relative improvement factor in $\sigma$ | $W\sqrt{WV}/M$ | $V\sqrt{VW}/M$ |

For specific signal types, simulations were designed and conducted to confirm how much of the theoretical improvement is possible. The simulations described below compared both algorithms (i.e., individual signals methods versus coherence signal fusion) applied to simulated data sampled in a wideband intermediate frequency. The basic parameters are listed in the following Table 2.

TABLE 2

| Parameter | Description | Notes |
|---|---|---|
| Ntimes | # simulated collections | Total number of simulations of collections of sequences of time slotted narrow band PSK signals per SNB and per sample fraction delay |
| SNRdb | SNR simulation range | Typically a set of values between 1 db and 40 db. |

TABLE 2-continued

| Parameter | Description | Notes |
|---|---|---|
| NF | Filter length | Half the length of the low pass data filter |
| P | samples per period | This regulates the relationship between sample rate and symbol rate. Increasing P means that wider wideband IF frequqncy ranges are possile with the simulated collection buffer. |
| T | Time slots per collection | Number of time slots per collection. More slots show the increasing advantage of the new method over the old one. |
| NS | symbols per time slot | This controls the number of symbols per time slot (all time slots are the same length). More edges from more symbols mean better TDOA |
| M | symbol order | Number of PSK symbol values per symbol. We kept this at M = 2 for this work. |
| TR | number of TDOA grids | Number of different fractional sample input delays to use for simulation. |
| FR | number of FDOA grids for CAF | Used for old method for simultaneous estimate of TDOA and FDOA using complex ambiguity function (CAF) processing. |
| Ferr | Input FDOA | This controls how much frequency offset is inserted into the simulated collection. |
| FH | Maximum emitter frequency | These two parameters control the range of random frequencies chosen for each time slot. We set FH = 0.5-1/P to avoid wrap around where the maximum frequency 0.5 denotes the nyquist rate (thus frequency is scaled by sample rate). |
| FL | Minimum emitter frequency | We always set FL = 0. |

The simulation loops over Ntimes problem instantiations, within which it loops over all the SNR values, within which it loops over one TR TDOA values within a sample, and for each, it selects T time slots at T random frequencies between a minimum emitter frequency, FL, and a maximum emitter frequency, FH, and creates a PSK signal with M modulation levels and NS symbols per time slot with P samples per symbol during these timeslots at the chosen frequencies. Fixed delays are created in the signal and additive Gaussian noise is added.

The reception process is modeled by taking each received signal, mixing (with the correct center frequencies), and band pass filtering (for the coherent filtered method) as well as unfiltered but coherently processed as a COAF will do. An optimization is done for the methods described herein to estimate the relative delays, the time (or TDOA) and the frequency offset (or FDOA). For comparison, the blocked CAF method takes each time slot individually and processes it using a sequence of CAFs. Those results are then combined to create the final TDOA and FDOA estimate.

The following concepts make the methods described herein effective.

Let $F_S$ and $F_T$ be down conversion frequency vectors that cover the entire collection for both receivers. If these were based on separate collect frequency estimates, they would be different. However, merging these two estimates results in a common cross-platform frequency downconversion vector, F.

The methods described herein can apply filtering based on the bandwidth of the signal once it has been mixed using the frequency vector F. Thus, one significant difference between the methods described herein and known signal processing methods is the mixing/filtering/downconversion process. A mixing vector with both phase $\Delta t$ and frequency offset $\Delta f$ is given by:

$$e^{2\pi i(F+\Delta f)(T+\Delta t)} = e^{2\pi i F t} e^{2\pi i \Delta f T} e^{2\pi i F \Delta t} e^{2\pi i \Delta f \Delta t}$$

For optimization, the middle two factors are necessary. Accordingly, the calculation depends on the original mixing frequency F. The final factor is a phase that disappears when computing a minimization metric. Specifically, the minimization metric for the simultaneous phase/frequency offset estimation is given by:

$$-|y^* z'| - |y(1:\text{end}-1)^* z(2:\text{end})'| - |y(2:\text{end})^* z(1:\text{end}-1)'|$$

where y is the first receiver's downconverted collection, and z is the phase/frequency adjusted second receiver's downconverted collection. Accordingly, the optimization maximizes power in three center correlation bins.

Figure 4:
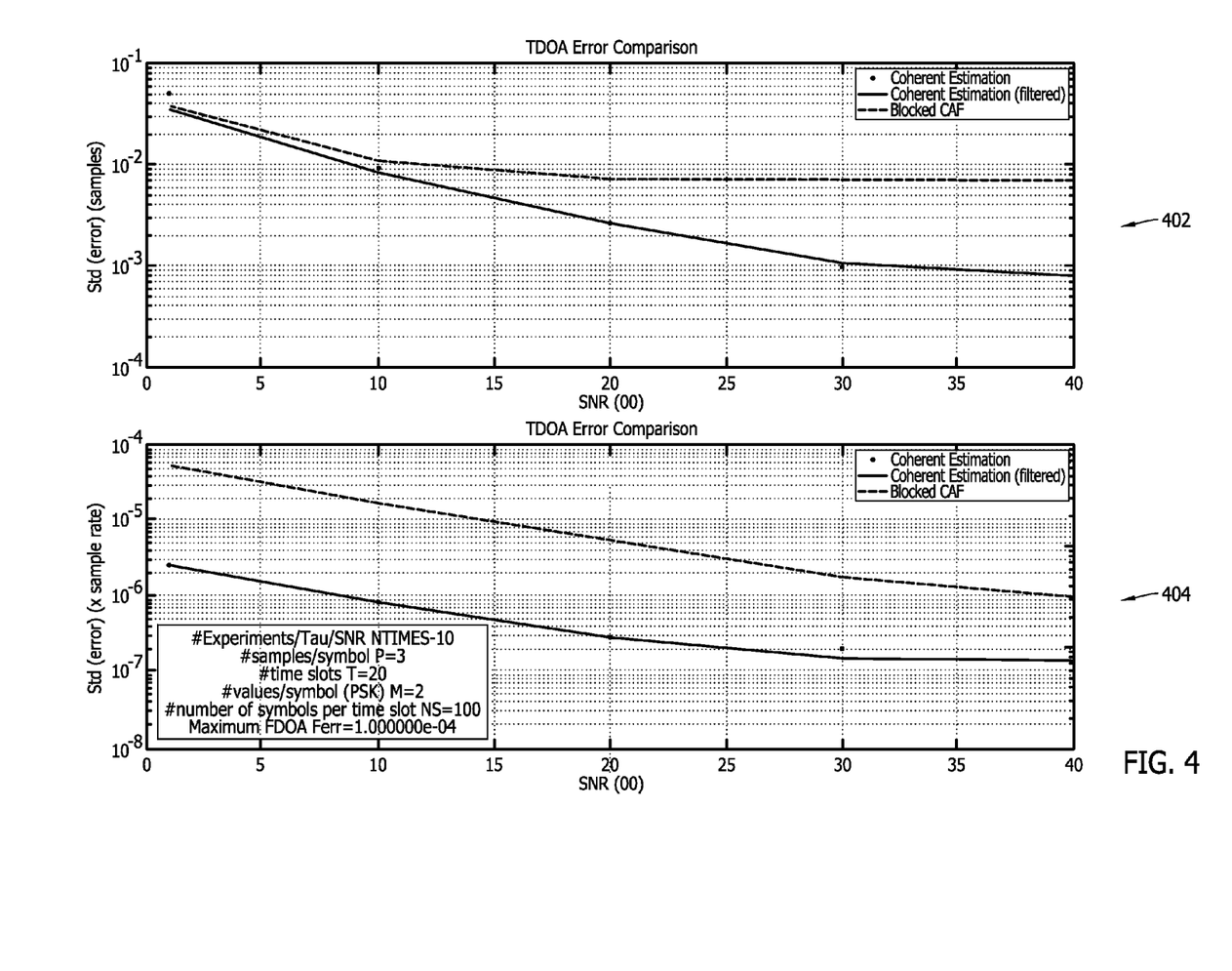
FIG. 4 is a set of graphs comparing known signal processing methods with the methods described herein.
Figure 5:
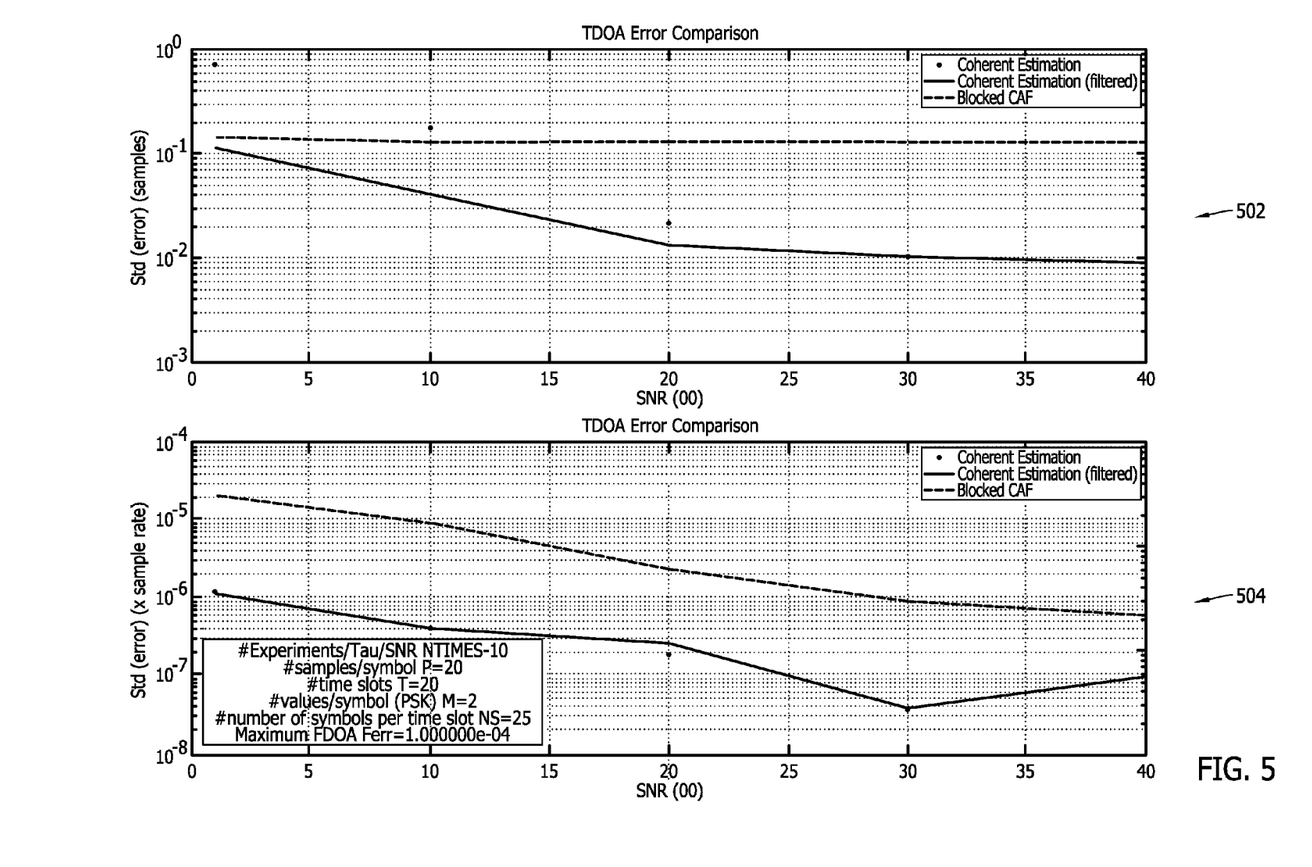
FIG. 5 is a set of graphs comparing known signal processing methods with the methods described herein.

FIGS. 4 and 5 are graphs 402, 404, 502, and 504 showing a known method (i.e., blocked CAF) versus the methods (filtered and unfiltered) described herein for both TDOA (upper plots 402 and 502) and FDOA (lower plots 404 and 504) in two different scenarios. The following Table 3 is a summary of the results in graphs 402, 404, 502, and 504.

TABLE 3

| Parameter Values | Low SNB | High SNB |
|---|---|---|
| P = 3, NTIMES = 10, T = 20, NS = 100, Ferr = 0.0001, see FIG. 3 | Improvements from slighty to 2X better for TDOA, also 8X better for FDOA | Improvements up to 8X better for TDOA. 8X better for FDOA. |
| P = 20, NTIMES = 10, T = 20, NS = 25, Ferr = 0.0001, see FIG. 4 | Improvements from significantly better (2X-10X) for TDOA, also 8X better for FDOA | Improvements up to 8X better for TDOA, 8X better for FDOA. |
| P = 20, NTIMES = 10, T = 2, NS = 100, Ferr = 0.0001 | Both methods similar for both FDOA and TDOA. | Both methods similar for FDOA. Improvements up to 2X better for TDOA. |
| P = 3, NTIMES = 10, T = 2, NS = 100, Ferr = 0.0001 | Both methods similar for FDOA. | Both methods similar for FDOA. Improvements slightly better for TDOA (2X). |

In graphs 402 and 404, P=3, NTIMES=10, T=20, NS=100, and Ferr=0.0001. In graphs 502 and 504, P=3, NTIMES=10, T=20, NS=25, and Ferr=0.0001. These parameters are explained in Table 2 above.

Accordingly, the methods described herein show significant improvements for large numbers of time slots and bandwidth increase in both FDOA and TDOA, as expected. Most simulations were performed with relatively few time slots (e.g., T=2) and showed the methods described herein still offered some improvement for TDOA, but not for FDOA.

The embodiments described herein provide improved signal analysis while using existing transmitter and receiver systems, without requiring new transmitter hardware or new waveforms. Using the embodiments described herein, existing legacy signals may be utilized for much more precise time and frequency estimation by fusing receiver processing of multiple legacy systems in a coherent manner. The systems and methods described herein allow for precise timing and frequency estimation using a wide-band analog to digital receiver with filtering and a complex offset ambiguity function calculation. The results of the processing can be used for timing acquisition, position estimation, velocity estimation, orientation estimation, as well as many other precision tasks that are ordinarily impossible with legacy signals. Accordingly, the systems and methods described herein may be implemented in a location system (e.g., a radar system) operable to determine a location of a signal transmitter (i.e., a transmission architecture) or a signal receiver (i.e., a receiver architecture).

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A signal processing system comprising:
   a transmission architecture comprising a first transmitter configured to transmit a first signal and a second transmitter configured to transmit a second signal; and
   a receiver architecture comprising:
      at least one antenna configured to receive the first and second signals; and
      a coherent signal fusion processing device communicatively coupled to said at least one antenna and configured to:
         generate a broadband analog signal that contains the first and second signals;
         digitize the broadband analog signal;
         isolate a first signal of interest based on the first signal and a second signal of interest based on the second signal from the digitized signal;
         estimate, relative to a reference template, at least one of a time difference of arrival and a frequency difference of arrival for the first signal of interest using a complex offset ambiguity function;
         estimate, relative to the reference template, at least one of a time difference of arrival and a frequency difference of arrival for the second signal of interest using the complex offset ambiguity function; and
         determine a location of at least one of the transmission architecture and the receiver architecture based on the estimated at least one of a time difference of arrival and a frequency difference of arrival for the first signal of interest and the estimated at least one of a time difference of arrival and a frequency difference of arrival for the second signal of interest.

2. A system in accordance with claim 1, wherein said at least one antenna comprises at least two different antennas.

3. A system in accordance with claim 1, wherein said at least one antenna comprises a single wideband antenna.

4. A system in accordance with claim 1, wherein the reference template is stored on said coherent signal fusion processing device.

5. A system in accordance with claim 1, wherein the reference template is a third signal that is received at a location separate from the first and second signals and transmitted to the receiver architecture.

6. A system in accordance with claim 1, wherein said transmission architecture comprises:
   a first antenna configured to transmit the first signal; and
   a second antenna configured to transmit the second signal, wherein the second antenna is different from the first antenna.

7. A location system configured to determine a location of at least one of a transmission architecture and a receiver architecture, said location system comprising a coherent signal fusion processing device comprising:
   a memory device; and
   a processor communicatively coupled to said memory device, said processor configured to:
      receive first and second signals;
      generate a broadband analog signal that contains the first and second signals;
      digitize the broadband analog signal;
      isolate a first signal of interest and a second signal of interest from the digitized signal;
      estimate, relative to a reference template, at least one of a time difference of arrival and a frequency difference of arrival for the first signal of interest using a complex offset ambiguity function;
      estimate, relative to the reference template, at least one of a time difference of arrival and a frequency difference of arrival for the second signal of interest using a complex offset ambiguity function; and
      output the estimated at least one of a time difference of arrival and a frequency difference of arrival for the first signal of interest and the estimated at least one of a time difference of arrival and a frequency difference of arrival for the second signal of interest.

8. A location system in accordance with claim 7, wherein to receive first and second signals, said processor is configured to:
   receive the first signal from a first antenna; and
   receive the second signal from a second antenna different from the first antenna.

9. A location system in accordance with claim 7, wherein to receive first and second signals, said processor is configured to receive both the first and second signals from a single wideband antenna.

10. A location system in accordance with claim 7, wherein the reference template is stored on said memory device.

11. A location system in accordance with claim 7, wherein the reference template is a third signal that is received at a location separate from the first and second signals transmitted to the receiver architecture.

12. A location system in accordance with claim 7, wherein to isolate a first signal of interest and a second signal of interest from the digitized signal, said processor is configured to:
   isolate the first signal of interest using a first constant delay filter; and isolate the second signal of interest using a second constant delay filter.

13. A signal processing method comprising:
receiving first and second signals at a coherent signal fusion processing device;
generating, using the coherent signal fusion processing device, a broadband analog signal that contains the first and second signals;
digitizing, using the coherent signal fusion processing device, the broadband analog signal;
isolating, using the coherent signal fusion processing device, a first signal of interest and a second signal of interest from the digitized signal;
estimating, using the coherent signal fusion processing device, relative to a reference template, at least one of a time difference of arrival and a frequency difference of arrival for the first signal of interest using a complex offset ambiguity function;
estimating, using the coherent signal fusion processing device, relative to the reference template, at least one of a time difference of arrival and a frequency difference of arrival for the second signal of interest using a complex offset ambiguity function; and
outputting the estimated at least one of a time difference of arrival and a frequency difference of arrival for the first signal of interest and the estimated at least one of a time difference of arrival and a frequency difference of arrival for the second signal of interest.

14. A method in accordance with claim 13, wherein receiving first and second signals comprises:
receiving the first signal from a first antenna; and
receiving the second signal from a second antenna different from the first antenna.

15. A method in accordance with claim 13, wherein receiving first and second signals comprises receiving both the first and second signals from a single wideband antenna.

16. A method in accordance with claim 13, wherein the reference template is stored on the coherent signal fusion processing device.

17. A method in accordance with claim 13, wherein the reference template is a third signal received at the coherent signal fusion processing device that is separate from the first and second signals.

* * * * *

UNITED STATES PATENT AND TRADEMARK OFFICE
CERTIFICATE OF CORRECTION

PATENT NO. : 9,910,132 B2  
APPLICATION NO. : 14/537351  
DATED : March 6, 2018  
INVENTOR(S) : Ray Page 1 of 1

It is certified that error appears in the above-identified patent and that said Letters Patent is hereby corrected as shown below:

In the Specification

In Column 6, Line 12, delete "$\hat{s}_i{}^*t) = F_i(S(t)) \approx s_i(t)$." and insert therefor -- $\hat{s}_i(t) = \mathcal{F}_i(S(t)) \approx s_i(t)$ --.

In Column 6, Line 53, delete "$\overrightarrow{\Delta \tau} = \{\Delta \tau_t\}$" and insert therefor -- $\overrightarrow{\Delta \tau} = \{\Delta \tau_i\}$ --.

In Column 7, Line 17, after "over its parameters," insert --"$\{\tau, \overrightarrow{\Delta \tau}, f\}$," --.

In Column 8, Lines 15-19, delete "$\dfrac{M}{\frac{1}{\sum_j b_j^2 T_j}(b_1/2 + (f_M - f_1) + b_M/2)^2}$." and insert therefor -- $\dfrac{M}{\frac{1}{\sum_i b_i^2 T_i}(b_1/2 + (f_M - f_1) + b_M/2)^3}$ --.

In Column 9, Line 9, Table 2, delete "possile" and insert therefor -- possible --.

In Column 10, Line 42, Table 3 Headers, delete "Low SNB" and "High SNB" and insert therefor -- Low SNR -- and -- High SNR --, respectively.

Signed and Sealed this  
First Day of May, 2018

Andrei Iancu  
*Director of the United States Patent and Trademark Office*